Nov. 3, 1959 K. P. LANNEAU ET AL 2,911,146

ANALOGUE COMPUTER FOR SOLVING SIMULTANEOUS EQUATIONS

Filed May 27, 1953 4 Sheets-Sheet 1

$$E_T = \frac{E_1 + E_2 + E_3 + E_4}{4}$$

$$E_y = \frac{E_1 + E_2 + E_3 + 0}{4} = \frac{E_4 + 0 + 0 + 0}{4} = E_z \text{(NULL CONDITION)}$$

KEITH P. LANNEAU
LINDSAY I. GRIFFIN JR. INVENTORS

BY W. O. Heilman ATTORNEY

Nov. 3, 1959 K. P. LANNEAU ET AL 2,911,146

ANALOGUE COMPUTER FOR SOLVING SIMULTANEOUS EQUATIONS

Filed May 27, 1953 4 Sheets-Sheet 2

Nov. 3, 1959 K. P. LANNEAU ET AL 2,911,146

ANALOGUE COMPUTER FOR SOLVING SIMULTANEOUS EQUATIONS

Filed May 27, 1953 4 Sheets-Sheet 3

2,911,146
Patented Nov. 3, 1959

2,911,146

ANALOGUE COMPUTER FOR SOLVING SIMULTANEOUS EQUATIONS

Keith P. Lanneau and Lindsay I. Griffin, Jr., Baton Rouge, La., assignors to Esso Research and Engineering Company, a corporation of Delaware Application May 27, 1953, Serial No. 357,694

2 Claims. (Cl. 235—180)

This invention concerns a novel analogue computer permitting the instantaneous and fully automatic solution of any desired number of simultaneous equations. In the preferred form of the invention a computer is provided which is composed entirely of electronic components, eliminating any mechanical elements or moving parts.

While a great many computers of different forms have been and are being developed, at the present time a need still exists for a fully automatic and virtually instantaneous computer adapted to accurately solve simultaneous equations. In the field of mass spectrometry, for example, it is ordinarily required to solve a number of linear simultaneous equations equal to the number of constituents in the mixture analyzed. Computers have been suggested and are being employed which simplify and shorten the solution of the necessary equations. However, heretofore no computer has been suggested which is capable of automatically continuously and instantaneously solving simultaneous equations.

The computer of this invention is therefore provided to accomplish this basic objective. The computer is applicable to the solution of any simultaneous equations which can be solved by the iterative process. While the invention is primarily concerned with the solution of linear simultaneous equations, the principles of this invention can be employed to solve non-linear simultaneous equations as well. While the invention could be employed for solving a single equation it is primarily of application in the solution of two or more simultaneous equations. Thus, referring to mass spectrometry again, it frequently occurs that it is necessary to solve from 10 to 20 simultaneous equations. This invention provides a computer which can instantaneously solve this number of equations.

Above and beyond the unique operating characteristics of the computer indicated above, the invention is characterized by simplicity of apparatus which is outstanding. The computer can be constructed and preferably is constructed so as to require no critically designed mechanical elements, completely eliminating the need for moving parts of any character. The electrical and electronic elements employed are also of a character available at reasonable cost, and necessity for expensive, critically designed electronic components is eliminated.

It will be apparent to those skilled in the art that a computer of this character is of particular application where it is necessary to frequently solve the same general form of simultaneous equations. Thus, where the mathematical requirements necessitate frequent computation involving the same general arithmetic steps the analogue computer of this invention is of particular utility.

In order to clearly indicate the nature and field of application of this invention, reference will be made to one of the attractive applications of the invention encountered in mass spectrometry. In the analysis of mixtures in a mass spectrometer, a sample of the mixture is bombarded with electrons so as to crack the constituents of the mixture into a variety of ions. These ions are separated in the mass spectrometer so that the relative abundance of ions of each mass may be identified. The ion concentration is ordinarily identified as the peak height (ion current) detected for each mass of the unknown mixture. By virtue of the fact that each molecule has a distinct cracking pattern in a mass spectrometer, it becomes possible to identify the original constituents of the mixture by consideration of the ion currents detected for different masses. This is complicated however by the fact, particularly in the case of hydrocarbons, that different constituents of the mixture have mutual ion contributions at various mass numbers. Ordinarily, therefore, it is necessary to solve a number of simultaneous equations in order to work out the percentage concentration of the various constituents in a mixture. These equations are of the following typical form for a mixture containing four constituents.

$$a_1x+b_1y+c_1z+d_1w=M_1$$
$$a_2x+b_2y+c_2z+d_2w=M_2$$
$$a_3x+b_3y+c_3z+d_3w=M_3$$
$$a_4x+b_4y+c_4z+d_4w=M_4$$

$a, b, c, d$=pure compound coefficients at various masses
$x, y, z, w$=unknown concentrations (percent÷100)
$M$=peak heights at various masses for the unknown mixture Each of these equations represents the peak height or ion current detected by the mass spectrometer for a particular mass M. Thus, in the first equation above, at mass $M_1$ the peak height will be equal to the linear summation of the ion contribution at that mass from each of the four unknown constituents. Each constituent will contribute to the peak height by a term which is the ion current which would be provided by the pure compound multiplied by the concentration of that compound in the mixture analyzed. Thus, if the first constituent in pure form would provide an ion current $a_1$ at mass $M_1$ then in a mixture, the contribution to the peak height at mass $M_1$ will be equal to $a_1x$, where $x$ is equal to the concentration of the constituent in the mixture. In this way the contribution of a second constituent at the same mass may be identified as $b_1y$, a third constituent as $c_1z$, and a fourth constituent as $d_1w$. By setting up equations for the ion contributions of each constituent at different masses, equations of the character identified above are developed and may be solved to determine the unknown concentrations.

It will be understood that in general, sufficient data must be obtained to develop a number of simultaneous equations equal to the number of constituents of the mixture analyzed. In carrying this out, ion masses are selected at which one of the constituents provides the major contribution to ion current to provide "leverage" to accurately solve the simultaneous equations.

Referring to the group of equations set forth above, the equations are generally arranged so that the major terms of the equations fall along a diagonal line of the matrix of the coefficients. Thus, in the equations above, it is desirable for solution that the major terms constitute $a_1x$, $b_2y$, $c_3z$, and $d_4w$, for example. This can be readily achieved by appropriately selecting the different masses M at which ion currents are detected. The computer of this invention serves to solve such simultaneous equations of the nature which can ordinarily be solved by an iterative method.

In the solution of simultaneous equations of this character by the iterative method, in the first step it may be assumed that all terms of the first equation, other than the major term $a_1x$ are zero. The first equation is then solved to provide an approximation of the value of $x$. This first approximate value for $x$ is then inserted in the second equation and the second equation is solved by assuming that all terms except $a_2x$ and $b_2y$ are zero. In this manner the approximate values obtained from prior steps are inserted in the subsequent equations. This procedure is then repeated until a sufficiently close approximation of the actual unknown concentrations is achieved. The computer of this invention provides an automatic solution of equations entailing a system of high speed approximations converging to the solution in a manner analogous to the iterative procedure identified above.

It will be observed that in the solution of simultaneous equations of the character identified, the only steps required are multiplication, addition, and an identification of equality between the two sides of the equations. Electrical circuits are now known for carrying out each of these operations individually or in combination. The present invention employs multiplication and addition circuits in an analogue form of each equation employing a system of feedback loops to automatically balance the equations, to automatically read in the first approximations obtained, to automatically re-balance the equations, etc., until solution is obtained. These steps are fully automatic in nature and may best be identified as a controlled oscillation of the equation networks which virtually instantaneously serves to solve the equations.

The attached drawings diagrammatically illustrate the essential elements of this invention:

Figure 5:
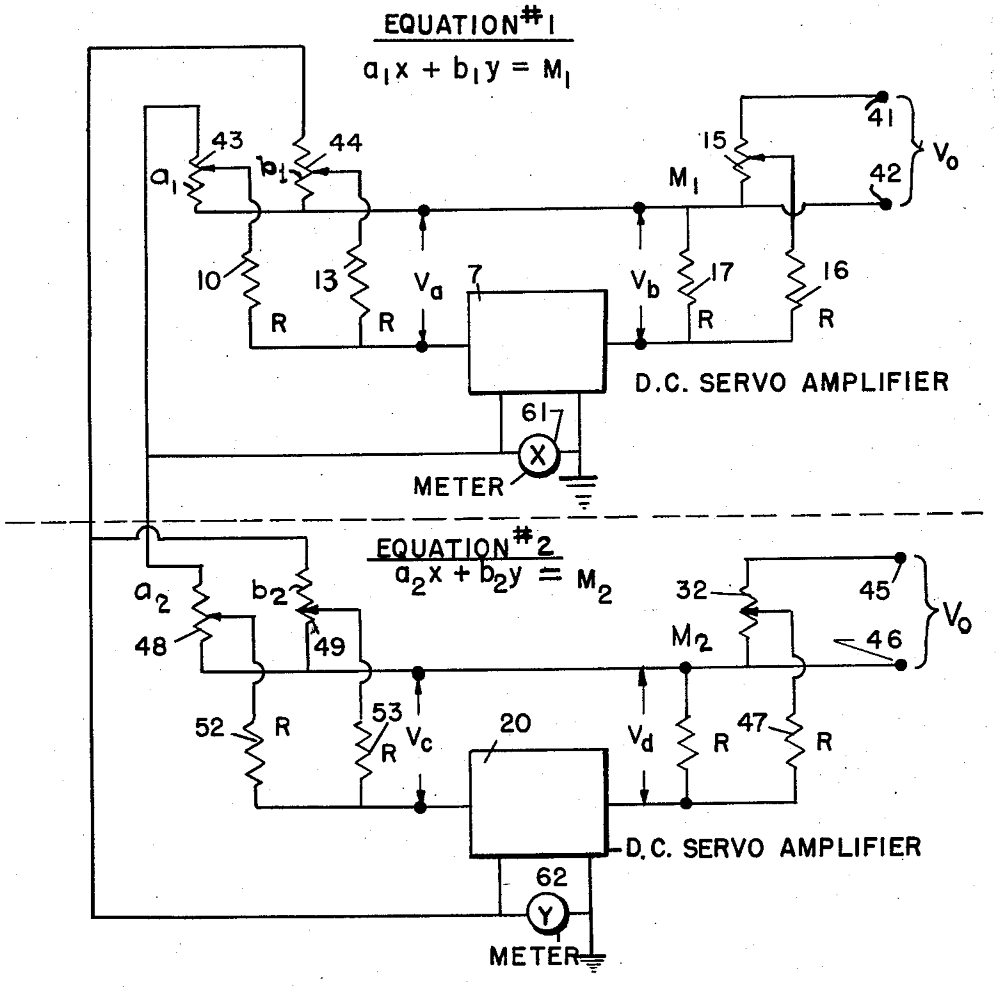

Fig. 5 diagrammatically illustrates the preferred form of this invention employing all electronic components.

Figure 6:
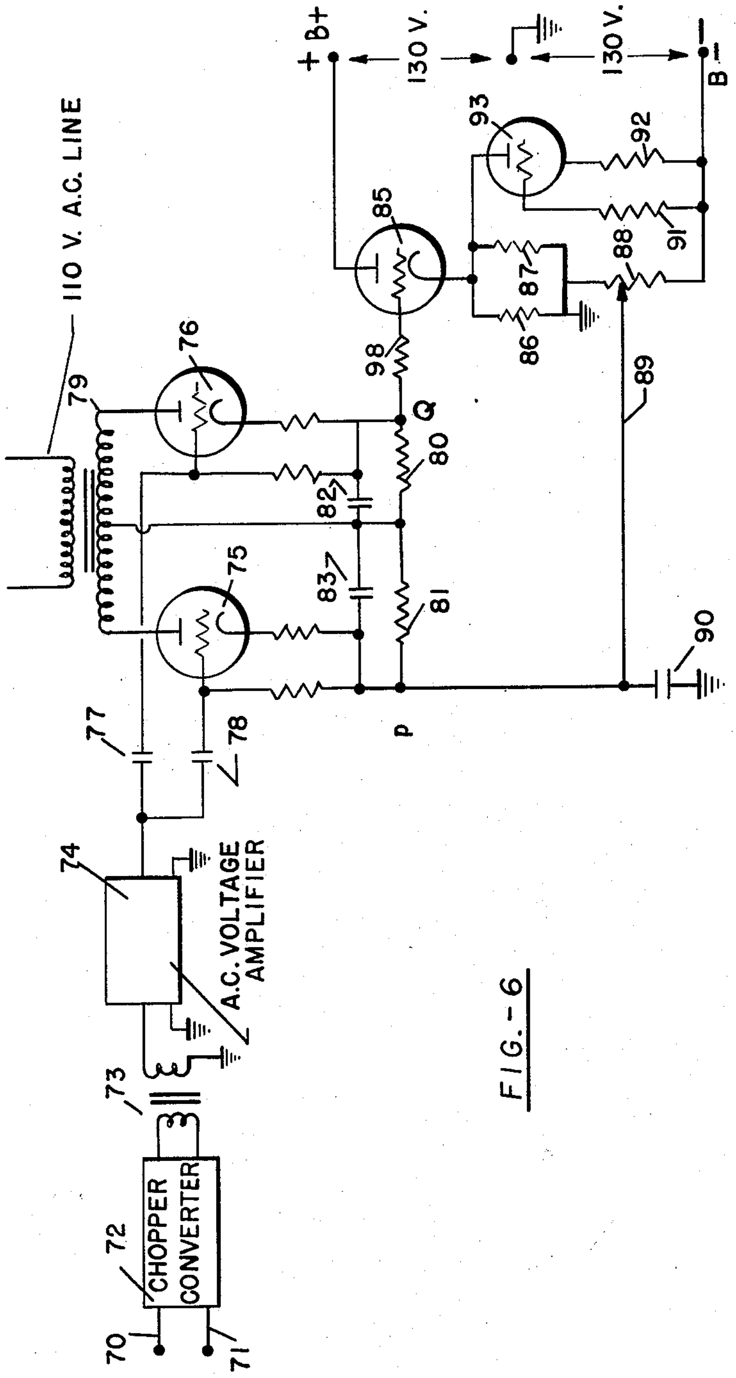

Finally, Figure 6 illustrates a preferred form of amplifier to be employed in the apparatus of Figure 5.

In describing this invention reference will be made to these figures of the drawings in sequential order to permit a logical development of the nature of this invention.

Figure 1:
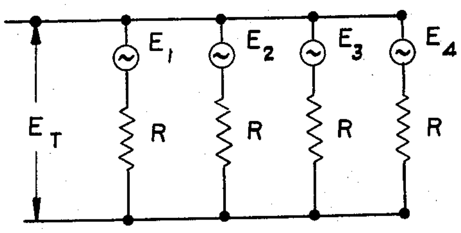
Figure 1 illustrates a form of addition circuit which may be embodied in the invention.

Referring first to Figure 1, a basic addition circuit is illustrated capable of adding voltages $E_1$, $E_2$, $E_3$, and $E_4$. In the circuit illustrated, resistors R each having the same value are employed. In this circuit, as developed from Kirchoff's law the voltage across the network indicated as $E_T$ is equal to the summation of the voltages $E_1$, $E_2$, $E_3$, and $E_4$, divided by 4. This basic form of addition circuit may be employed in the computer of this invention.

Figure 2:
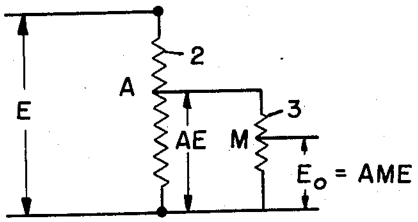
Figure 2 illustrates a multiplication circuit which may be employed.

In Figure 2 a circuit of a character which can be employed for multiplication is illustrated. In this circuit it is assumed that input voltage E is applied to the network illustrated. Voltage E is applied across a variable resistor 2 provided with a voltage tap which is illustrated as contacting the resistor 2 at point A. If the value of the resistor 2 is assumed to be unity, the fraction of the resistance A tapped from the resistor will permit detection of a voltage AE equal to the product of the voltage E and the fraction of the resistance A which is tapped. This multiplication technique may be extended as desired to include other multipliers. Thus, the circuit of Figure 2 includes an additional multiplication step in which resistor 3 is tapped at M to permit detection of a final voltage $E_0$ which is equal to the product AME. This form of multiplication circuit may be employed in the computer of this invention.

Figure 3:
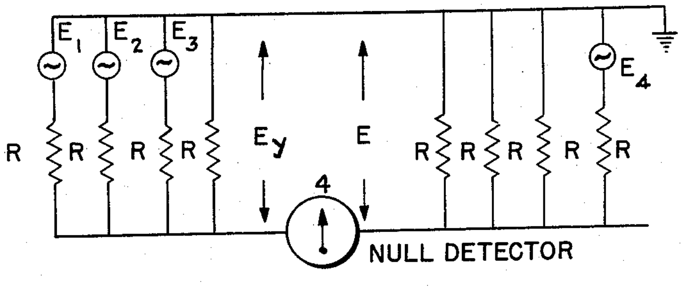
Figure 3 illustrates a basic circuit of a character to equate a number of different terms which are added to each other on both sides of the equation network.

Figure 3 illustrates a basic form of circuit which may be used as an analogue of an equation permitting balancing of the equation with any desired number of addition terms on each side of the equation. In the circuit of Figure 3, a null detector 4 such as a galvanometer is connected between two addition circuits of the character illustrated in Figure 1. In the example given in Figure 3, it may be assumed that $E_1$, $E_2$, and $E_3$, are fixed voltages while $E_4$ is a variable voltage. In this circuit when $E_4$ has been adjusted to balance the two addition circuits as indicated by the null detector, the equations will be balanced as indicated by the relationship indicated in Figure 3. It is apparent that the circuit of Figure 3 may be used to equate the addition of terms which are the product of two or more factors. Thus, by using the multiplication circuit of Figure 2, to supply the voltages to the resistors R of Figure 3, the addition and equation of any desired number of products may be achieved. The circuit of Figure 3 is thus capable of indicating the condition of equation of a linear equation.

It is this basic form of equation circuit which is used as the analogue of each equation in this invention.

The circuits illustrated in Figures 1 through 3 are of a conventional character and of a nature well known in the art. It is therefore considered unnecessary to further describe these circuits.

Figure 4:
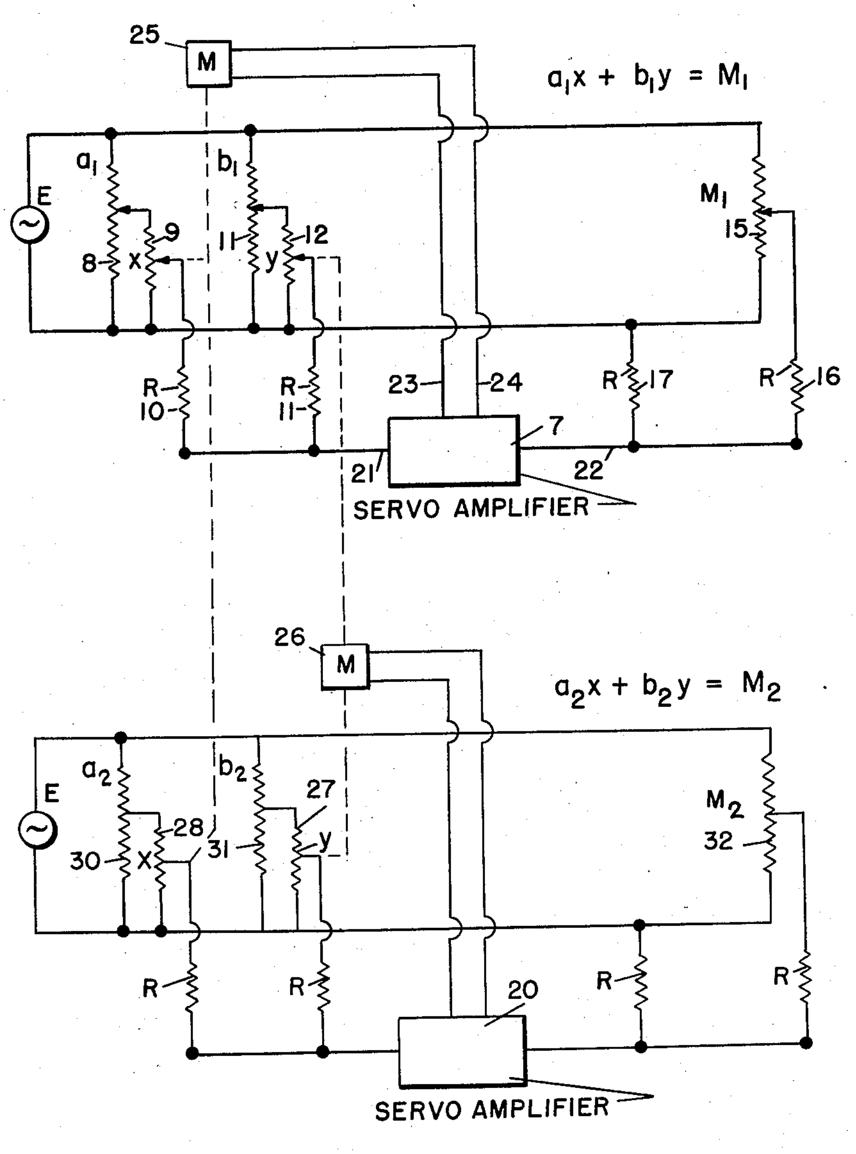
Figure 4 shows the application of these basic circuits in a computer which embodies the principles of this invention to provide for the automatic solution of simultaneous equations.

Referring now to Figure 4, an electro-mechanical arrangement is illustrated permitting the chronological simultaneous solution of a system of mathematical simultaneous equations. For simplicity, it is assumed that it is desired to solve two linear simultaneous equations of the form:

$$a_1x+b_1y=M_1$$
$$a_2x+b_2y=M_2$$

As indicated, these may be equations of the character employed in mass spectrometry. In this event the terms a and b would represent the pure compound coefficients of two constituents of a mixture at various masses as detected in a mass spectrometer. In this case the $x$ and $y$ terms would be equal to the unknown concentrations of the two constituents of the mixture. The M terms would represent the peak heights or ion currents at masses $M_1$ and $M_2$ for the unknown mixture. As formerly stated, in the computer of this invention, it is preferred that a matrix is arranged so that major terms of the equation lie along a diagonal of the matrix. Thus, in the matrix set forth above, it may be assumed that $a_1x$ is the major term of the first equation and $b_2y$ is the major term of the second equation.

In Figure 4, the equation network in the upper portion of the drawing is the analogue of the first equation $a_1x+b_1y=M_1$. The circuit at the lower portion of the drawing similarly is the analogue of the second equation $a_2x+b_2y=M_2$. The nature of the circuits illustrated in Figure 4 may be readily appreciated by reference to the basic circuits illustrated and described in Figures 1, 2 and 3. Thus, in the upper circuit of Figure 4 each side of the circuit connected to the servo amplifier 7 is provided with two resistors R numbered 10 and 11, and 16 and 17. The voltage supplied to each of the resistors is obtained from a variable resistor arrangement supplied by a constant voltage E. Thus, resistor 8 is tapped at a portion of the resistor to take off a voltage equal to $a_1$E. This voltage is again multiplied by use of resistor 9 so that the tap of this resistor can take off a voltage $Ea_1x$. This voltage $Ea_1x$ is then supplied to the first resistor 10. Similarly, resistors 13 and 12 are employed to supply a voltage $Eb_1y$ to the second resistor 11. On the opposite side of the equation represented by the circuit connected to the other side of the servo amplifier 7, a voltage $EM_1$ is derived from resistor 15 and is supplied to resistor 16. Since this is the only term on the righthand side of the equation identified, no voltage is supplied to resistor 17 analogous to that supplied to resistors 10, 11 and 16. Since the voltage E is a constant voltage applied to both sides of the equation, the network illustrated provides the desired analogue of the equation $a_1x+b_1y=M_1$.

In the same manner, the circuit at the lower portion of Figure 4 represents the second equation $a_2x+b_2y=M_2$. In the drawing the tapped positions on the resistors are identified by letters permitting the identification of the requisite portions of the circuit. In practice, the coefficient values $a_1$, $b_1$ and peak height values $M_1$ and $M_2$ may be present in the matrix by suitable indicator dials or by means of a reference device such as a decade potentiometer.

It will be observed that in the apparatus of Figure 4, servo amplifiers 7 and 20 are substituted at the portion of the network occupied by the null detector 4 in Figure 3. Each of the servo amplifiers 7 and 20 are of a character to provide a voltage output having a phase and magnitude controlled by the differential contribution of each side of the equation network connected to the amplifier. Thus, servo amplifier 7 will be supplied with a voltage through conductor 21 contributed by the circuit representing the left side of the equation. Conductor 22 will similarly supply a voltage to amplifier 7 which is contributed by the circuit representing the right side of the equation. The output of the servo amplifier provided at leads 23 and 24 will provide a voltage having a magnitude which may be proportional to the difference in voltages contributed by each side of the network and having a phase dependent on which voltage is greater. The voltage across leads 23 and 24 may thus be identified as a feedback voltage uniquely indicating the unbalance (error voltage) of the equation represented. This feedback voltage may be supplied to a servo motor 25 which may be employed to position the voltage tap of resistor 9 so as to balance the equation represented by the network. Thus, if resistor 9 constitutes a helipot, for example, the servo motor 25 may be directly coupled to the helipot so as to vary the voltage at the tap of resistor 9 contributed to the resistor 10 until no error signal is detectable by servo amplifier 7. The connection of the servo amplifier and the servo motor to the circuit illustrated is thus capable of balancing the equation identified.

In a similar manner the feedback voltage developed by servo amplifier 20 may be supplied to servo motor 26 used to position resistor 27 so as to balance the second equation $a_2x+b_2y=M_2$. In this case the servo motor 26 is mechanically coupled to resistor 27 so as to position this resistor until no feedback voltage is developed by the amplifier 20.

The present invention is based on the discovery that simultaneous solution can be automatically carried out by a suitable coupling of the equation networks employing the feedback system identified. Thus, servo motor 25 is to be directly and synchronously coupled to both the resistors 9 and 28 representing the $x$ terms in the two equations. Similarly, servo motor 26 is to be directly coupled to the resistors 12 and 27 representing the $y$ terms of the two equations. The operation of these two interrelated circuits may then be considered to be as follows:

When resistors 8, 11 and 15 of the upper circuit and resistors 30, 31 and 32 of the lower circuit have been set at values corresponding to the terms $a_1$, $b_1$, $M_1$, and $a_2$, $b_2$, $M_2$, respectively, the servo amplifiers 7 and 20 may be connected as illustrated. Servo motor 25 in response to the error signal of amplifier 7 will drive resistor 9 in a manner tending to balance the network representing the first equation, and at the same time will similarly position resistor 28 in the second equation network by the direct coupling of the servo motor 25. In a perfect analogue manner, this fulfills the mathematical condition that the $x$ values of both equations are identical. Simultaneously, servo motor 26 will tend to balance both equations by positioning the $y$ resistors 12 and 27 in response to the error signal of the network representing the second equation. It would be presumed that this type of coupling action between the variable resistors of the two equation circuits would result in nothing more than unstable oscillation or hunting action. In fact, however, it has been found that in some manner which cannot be fully identified, the circuits set up and operated as described, function to come to a condition of equilibrium at which the desired values of $x$ and $y$ are obtained, solving the two simultaneous equations. As indicated, oscillation of the circuits undoubtedly occurs in arriving at this result, but this oscillation serves to permit rather than to hinder the required balancing of the two equation networks. The oscillation resulting in solution of the equations is a low amplitude, high frequency oscillation which permits balancing the equations in a virtually instantaneous manner. For this objective it is apparent that servo loops of high gain and low time constant are to be employed.

While the apparatus of Figure 4 has been described for simplicity with reference to only two simultaneous equations, it is apparent that this apparatus may be employed for the solution of any desired number of simultaneous equations. It is necessary to supply an equation network of the character illustrated in Figure 4 for each of the equations to be solved. A servo amplifier connected to each of the equation networks and responsive to the error signal of each network is employed to supply a feedback signal to a servo motor directly coupled to the appropriate terms of each of the equations.

For best operation, the servo amplifier associated with a given equation should control positioning of a variable resistor in the major term of the equation. This is not essential however, since successful operation has been achieved when the servo controlled variable resistor is not in the major term of the equation.

It is apparent that the solutions for $x$ and $y$ may be read from calibrated dials of the $x$ and $y$ potentiometers, or other means may be employed to determine the solution.

In the case of linear simultaneous equations, the variable resistors employed will be linear resistors, while logarithmic functions and the like may be represented by other suitably designed resistors.

The general principles of the apparatus of Figure 4 are employed in an improved and desirable form in the circuit of Figure 5. In the circuit of Figure 5 the servo motors are eliminated by employing the voltage output of an amplifier system to provide an electrical, rather than electro-mechanical feedback to the appropriate term of each of the equations. Thereby an interlocked multiple feedback system can be achieved which effectively accomplishes simultaneous solution of the equations. The circuit of Figure 5 is arranged in the same general fashion as the circuit of Figure 4 to permit ready comparison of the two and to permit an understanding of the operation of the circuit of Figure 5 from what has been said about the arrangement of Figure 4. Thus, in the upper portion of the circuit of Figure 5, a network is provided as an analogue of the first equation $a_1x+b_1y=M_1$. For this purpose resistors 10, 11, 17 and 16 may be employed just as in Figure 4. An external voltage source such as a battery is employed to impress a constant voltage $V_0$ across the terminals 41 and 42, and thus across resistor 15 which is tapped to represent the value of $M_1$. This voltage $M_1$ is supplied to the resistor 16. The voltage supplied to resistor 10 is derived from resistor 43. The output of the amplifier 7 is conducted as a feedback voltage across resistor 43. Identifying the feedback voltage as $x$, the voltage supplied to resistor 10 can then be represented as $a_1x$ dependent on the tapped setting of resistor 43.

This feedback voltage $x$ derived from the upper circuit is also impressed across resistor 48 of the lower circuit to satisfy the mathematical identity of the $x$ quantities in each equation.

The same constant voltage $V_0$ is supplied to the terminals 45 and 46 connected across the resistor 32 in the lower circuit of Figure 5. A voltage $V_0M_2$ may thus be supplied to the resistor 47 of this circuit. The output of amplifier 20 derived from the error signal of the lower circuit, which may be identified as voltage $y$, is impressed across resistor 49 to supply a voltage $b_2y$ to resistor 53. Similarly, the output voltage $y$ of amplifier 20 is applied to resistor 44 of the upper portion of the circuit to supply a voltage $b_1y$ to the resistor 11.

The coefficient values $a_1$, $b_1$, $a_2$, and $b_2$ are represented as angular shaft rotations of the linear potentiometer 43, 44, 48 and 49, respectively which, with resistors 15 and 32, constitute voltage dividing means or multiplication circuits. Similarly, the M values $M_1$ and $M_2$ are represented as the angular shaft rotations of the linear potentiometers 15 and 32. The voltage outputs of the amplifiers 7 and 20, identified as voltages $x$ and $y$, may be read on the meters 61 and 62. These meters could constitute volt meters. It will be observed that in this circuit the coefficient potentiometers perform the function of operators multiplying the $x$ and $y$ voltages supplied by factors $a_1$ and $b_1$.

$V_0$ is the D.C. voltage supplied across the terminals of the M potentiometers and is an arbitrary constant which may be assumed to be unity. $V_a$ and $V_b$, as identified in Figure 5, represent the voltages across either side of the equation network. When the equation network is balanced and the input to servo amplifier is substantially zero, then $V_a$ is equal to $V_b$ and $a_1x+b_1y$ is equal to $M_1$, satisfying the equation. It will be seen therefore that amplifier 7 operates to provide a feedback voltage $x$ which contributes toward driving the error signal at amplifier 7 to the zero level.

The same relations apply to the lower portion of the circuit of Figure 5 where at balance $V_c$ is equal to $V_d$ and $a_2x+b_2y$ is equal to $M_2$. It should be observed that since $V_0$ is arbitrary, resistors 15 and 32 need not be equal or of any specific value. In fact, the voltages $M_1$ and $M_2$ applied to resistors 16 and 47 may be generated externally and fed into the computer.

Balance of the equation networks is automatically attained by the interlocking multiple feedbacks as follows:

In each of the equation networks there is a feedback signal from the amplifier in that equation to the major term of the equation. The phase of this signal is such that the signal is a corrective one which tends to reduce the amplitude of the error signal at the input of the amplifier in that equation. In addition there is another minor feedback signal in the other term of this equation, derived from the linkage to the major feedback loop of the other equation circuit. This minor feedback signal will in general be of a phase such that it tends to increase the amplitude of the error signal at the input to the amplifier in the equation circuit which is presently being considered.

If the arrangement of the matrix is such that convergence is possible with an iterative method, the action of the corrective signal from the major feedback is sufficiently predominant to overcome the effect of the opposing minor feedback signal. While the interlocked feedback loops are functioning simultaneously, the general effect will be for the major feedback term in each of the loop circuits to predominate increasingly in time and the result is a form of damped oscillation, decreasing in amplitude and possibly frequency, for the error signal at the input of each of the amplifiers. Convergence of the entire system will take place when the amplitude of each of the oscillatory error signals is zero. The D.C.

magnitude of each of the error signals will necessarily be something other than zero inasmuch as the amplifiers have something less than infinite gain and a residual input unbalance of finite magnitude is required. In other words, in order for this feedback system to balance and solve both equations with a zero error signal, it would be necessary to provide an amplifier of infinite gain. For practical purposes, an amplifier is employed having a sufficiently high gain so that the magnitude of the error signal required to develop suitable feedback voltages is negligible. In general an amplifier may be employed having a gain of about 10,000 to 300,000,000. A gain of the order of 100,000,000 provides an accuracy of about four digits when good quality electrical components are employed in the circuit network.

In Figure 6 a particularly preferred form of amplifier system is illustrated which may be employed as the amplifier 7 or 20 in the circuit of Figure 5. The amplifier of Figure 6 is particularly attractive since it permits the development of negative as well as positive feedback signals. In Figure 6 the input to the amplifier, which is the D.C. error signal from the computing circuit, is supplied across terminals 70 and 71 connected to the chopper converter 72 which serves to provide alternating voltage. The alternating output of the converter 72 will vary in magnitude proportionately to the D.C. input impressed on the converter. The phase of the alternating output will be a function of the polarity of the D.C. input or in other words will depend on whether the voltage at terminal 70 is positive or negative with respect to the voltage at terminal 71. The converter is transformer coupled through transformer 73 to a high gain voltage amplifier 74. Sufficient gain can be achieved by employing 3 or 4 stages of amplification. It should be observed that the overall gain of the system is not only provided by the amplifier 74, but also by the voltage gain supplied by transformer 73 and the phase circuit associated with tubes 75 and 76 to be described. The overall gain achieved by the combination of these units is to be adjusted so as to provide a gain of the order of 100,000,000.

The output of amplifier 74 is then impressed in parallel on the grids of tubes 75 and 76 through the coupling condensers 77 and 78. Tubes 75 and 76 are connected in a particular phase relation having their plate voltages supplied by center-tapped transformer 79. The cathode and grid resistors illustrated are employed to permit self-biasing of these tubes. Connected between the cathode of each tube and the center tap of the secondary of transformer 79 are resistors 80 and 81, respectively. These resistors preferably have a high impedance, as for example, about 1 megohm.

Condensers 82 and 83 are connected in parallel across these resistors. This RC combination serves to filter the pulsating D.C. voltages in the cathode circuits of the two tubes. The grid and cathode circuits of tubes 75 and 76 are grounded through the condenser 90. This arrangement of the circuits associated with tubes 75 and 76 results in the grid and cathode circuits of these tubes having the same A.C. impedance to ground. However, the cathodes do not necessarily have the same D.C. potential with respect to ground. This is required in order to provide the differential output of these tubes at a suitable level for the output stages of this entire circuit to be described.

The operation of the circuit of Figure 6 heretofore described may now be understood. The D.C. error signal applied to the chopper converter 72 is first changed to an alternating voltage for facility of amplification. This alternating voltage after substantial amplification as by the amplifier 74 is impressed on the grids of tubes 75 and 76 arranged in opposite phase relation.

For one polarity of the D.C. error signal, tube 76 conducts and a current flow is produced through resistor 80 to cause point Q to rise more positive relative to point P. For the other polarity of the D.C. error signal, tube 75 is conducting and a current flow through resistor 81 causes point Q to fall more negative relative to point P. Due to the filtering action of the RC network in the cathode circuits of these tubes, the potential between points P and Q is a D.C. potential. It is practical to secure a D.C. voltage swing between points P and Q from a value of about +300 volts to about −300 volts.

The variable D.C. signal from points P and Q is supplied to tube 85 through the limiting resistor 98. The cathode of tube 85 is connected in parallel to the grounded resistors 86 and 87. In addition, the cathode of tube 85 is directly connected to the plate of the tube 93. The grid and cathode of tube 93 are biased by application of a $B^-$ voltage which may be of the magnitude of about −130 volts as illustrated. Finally, the grid of tube 85 is negatively biased by suitable adjustment of the tap 89 of resistor 88 which is connected to the source of $B^-$ voltage.

In this arrangement tube 93 draws a constant D.C. current through the parallelled resistors 86 and 87. Because of this constant negative voltage drop across these resistors, it is necessary to bias point P at a negative potential relative to ground as described, in order that tube 85 be biased for its appropriate quiescent operating region. Consequently, when tube 75 is conducting, the cathode follower 85 will be cut off and the voltage across resistors 86 and 87 will be negative relative to ground due to the constant D.C. current drawn through these resistors by tube 93. However, when tube 76 is conducting the grid of cathode follower 85 will be driven positive enough to cause tube 85 to conduct, causing the voltage across resistors 86 and 87 to become positive relative to ground. This circuit therefore accomplishes the purpose of supplying a D.C. voltage across resistors 86 and 87 of positive polarity for an input error signal of one polarity and a negative voltage for an error signal of the other polarity. The magnitude of the voltage across resistors 86 and 87 are proportional to the magnitude of the input error signal.

Employing the circuit of Figure 6 in the computer of Figure 5, resistors 86 and 87 are connected as resistors 43 and 48 of the circuit of Figure 5. By tapping these resistors as illustrated in Figure 5, appropriate feedback voltages are obtained to balance the $x$ terms of the two equations. Similarly, by employing a second circuit of the nature illustrated in Figure 6, the resistors corresponding to resistors 86 and 87 are connected as resistors 44 and 49 in Figure 5 to supply the appropriate feedback voltage $y$ to the equation.

The availability of a negative feedback voltage in the computer of Figure 5 as attained by the amplifier of Figure 6 makes it possible to handle simultaneous equations where negative values of the unknown $x$ and $y$ may be desired. Furthermore, the availability of variable polarity as well as amplitude for the corrective feedback signal improves the speed and accuracy with which the interlocking feedback loops causes convergence of the $x$ and $y$ feedback values to solve the equations.

What is claimed is:

1. A computer for solving a series of at least two simultaneous equations, comprising in combination, a series of $n$ D.C. electrical equation circuits, wherein $n$ represents a number corresponding to the number of said simultaneous equations each said equation circuit including an A.C. amplifier system adapted to develop a D.C. output voltage characteristic in polarity and magnitude of any unbalance between two D.C. voltages separably impressed thereon, said amplifier system including a chopper converter having a pair of input terminals, a high gain A.C. amplifier, transformer coupled to said converter, a phase discriminating rectification circuit connected to the output of said high gain amplifier to develop a D.C. voltage output, and means to amplify the power of said output, plus a series of $2n$ resistor elements of substantially equal value connected to form first and second networks of $n$ resistor elements each, wherein each network and each resistor element therein has a counterpart in each of $n-1$ circuits, and each of at least $n+1$ resistor elements in said circuit corresponds to a term in one said equation, at least $n$ variable voltage divider means respectively coupled to individual resistor elements of said first network, variable voltage divider means coupled to at least one resistor element in said second network, said first and second networks being individually connected to a separate one of said pair of chopper converter input terminals, means for impressing a D.C. voltage of constant magnitude and polarity upon at least one resistor element of said second network which voltage is an analogue of the known term in the equation corresponding to said equation circuit, means for impressing the D.C. voltage output of said amplifier system upon one of said voltage dividing means and resistor element in said first network and simultaneously upon each corresponding voltage divider means and resistor element in $n-1$ other equation circuits in said series whereby the D.C. voltage impressed upon each of $n$ resistor elements in the first network of each circuit through said coupled voltage divider means is the analogue of one of said unknown terms in the equation corresponding to said equation circuit, said resistor elements and terms respectively corresponding from equation circuit to equation circuit and from equation to equation.

2. An analogue computer for solving at least two simultaneous equations, comprising the combination of a series of $n$ electrical analogue equation circuits, wherein $n$ represents a number corresponding to the number of said equations each circuit including two networks of at least $n$ resistor components of equal value each, each of said networks and each resistor component therein having a counterpart in each circuit and each of at least $n$ plus 1 resistor components in said circuit corresponding to a term of one of said equations in each circuit, at least $n$ plus 1 variable voltage dividing means coupled respectively to each of at least $n$ plus 1 resistor components, whereby to establish for each said resistor component a constant voltage input value proportional to a constant factor of one term in said equation; means for impressing a D.C. voltage of constant magnitude and polarity upon at least one resistor component of one network in each circuit through the voltage dividing means coupled to said resistor component, means for impressing a D.C. voltage of variable magnitude and polarity upon each of $n$ remaining resistor components in each circuit through the voltage dividing means coupled thereto, said latter means including a chopper converter having a pair of input connectors respectively connected to one of said networks in said circuit and a pair of output connectors, a high gain A.C. amplifier, transformer coupled to the output connectors of said chopper converter, said amplifier connected in parallel to a pair of self-biased tubes, having the same impedance to ground in the grid and cathode circuits, said tubes constituting a phase discriminating, rectification circuit wherein the grids of said tube are energized simultaneously by the output of said amplifier, an A.C. transformer wherein the secondary winding is connected to the respective plates of said tubes in opposite phase relation, and RC filter network in the cathode circuit of each time connected through a center tap on said transformer secondary winding to the plate circuit of each of said tubes, whereby to develop a D.C. potential in said cathode circuits across said RC networks, means to impress said D.C. potential upon the grid of a third tube, means for negatively biasing said grid of said third tube, the cathode of said third tube being connected in parallel to a single voltage dividing means in each circuit which dividing means are respectively coupled to one of said counterpart resistor components in each circuit, and means to produce a substantially constant negative potential across said parallel connected variable voltage dividing means with respect to ground.

References Cited in the file of this patent

UNITED STATES PATENTS

| | | |
|---|---|---|
| 2,426,589 | Bollman | Sept. 2, 1947 |
| 2,436,741 | Bussey | Feb. 24, 1948 |
| 2,454,549 | Brown et al. | Nov. 23, 1948 |
| 2,459,106 | Hardy et al. | Jan. 11, 1949 |
| 2,519,262 | Lovell | Aug. 15, 1950 |
| 2,524,692 | Bradley | Oct. 3, 1950 |
| 2,542,160 | Stoner et al. | Feb. 20, 1951 |
| 2,579,571 | Heck | Dec. 25, 1951 |
| 2,584,809 | Oberlin | Feb. 5, 1952 |
| 2,595,185 | Zauderer | Apr. 29, 1952 |
| 2,665,066 | Hornfeck | Jan. 5, 1954 |